US005427398A

United States Patent [19]

Weybrecht

[11] Patent Number: 5,427,398

[45] Date of Patent: Jun. 27, 1995

[54] ALL-TERRAIN WHEELCHAIRS AND APPARATUS THEREFOR

[76] Inventor: Steven L. Weybrecht, 8181 Bear Creek Blvd., White Haven, Pa. 18661

[21] Appl. No.: 145,278

[22] Filed: Oct. 29, 1993

[51] Int. Cl.$^{6}$ .......................... B62M 1/14; B62B 5/02

[52] U.S. Cl. ................................ 280/304.1; 301/40.1; 301/41.1; 305/7; 280/250.1

[58] Field of Search .......................... 280/304.1, 250.1; 301/5.1, 5.23, 40.2, 40.1, 41.1, 38.1, 36.1, 30; 305/7

[56] References Cited

U.S. PATENT DOCUMENTS

| | | | |
|---|---|---|---|
| 1,293,746 | 2/1919 | Foley | 301/40.2 |
| 1,433,164 | 10/1922 | Whitehead | 301/40.2 |
| 1,580,607 | 4/1926 | Jones | 301/40.2 |
| 4,641,850 | 2/1987 | Rice et al. | 280/304.1 |
| 4,877,260 | 10/1989 | Howland | 280/304.1 |
| 5,181,733 | 1/1993 | Tague | 280/304.1 |
| 5,261,684 | 11/1993 | Soto | 280/304.1 |

FOREIGN PATENT DOCUMENTS

| | | | |
|---|---|---|---|
| 2224980 | 5/1990 | United Kingdom | 280/304.1 |

*Primary Examiner*—Mitchell J. Hill

*Attorney, Agent, or Firm*—Sanford J. Piltch

[57] ABSTRACT

A lightweight set of attachments adapted to convert a conventional wheelchair to an all-terrain vehicle without compromising the general utility of said wheelchair for everyday use.

26 Claims, 5 Drawing Sheets

ALL-TERRAIN WHEELCHAIRS AND APPARATUS THEREFOR

FIELD OF THE INVENTION

The present invention relates generally to wheelchairs and more specifically to an apparatus attachable to a conventional wheelchair so as to convert it to a vehicle which may be utilized in all types of terrain.

BACKGROUND OF THE INVENTION

The conventional wheelchair is typically comprised of two large diameter, ground engaging, narrow width rear wheels mounted onto an axle positioned beneath the seat portion of the chair, with a pair of smaller diameter, narrow width ground engaging wheels positioned forwardly of the rear wheels. The front wheels are pivotally mounted onto vertical stanchions and give the user of the chair the ability to steer, at least to some degree, the chair. Typically, the occupant of the wheelchair is seated in a conventional fashion between the rear wheels, with the lower portion of the operator's legs being more or less perpendicular to the ground and supported in a footrest attached thereto.

The operator of a conventional wheelchair as described above, when attempting to using it off road, is faced with a number of practical problems. For example, almost all commercially available chairs utilize relatively narrow, solid or pneumatic tires on both the front and rear wheels. When utilized in sandy, loose or unstable terrain, such wheels tend to sink into the underlying terrain and loose traction resulting in the occupant being left stranded. Further, such wheels are subject to slicing or puncturing by rocks, branches and the like. To lessen the puncture and traction loss problems several solutions have been propounded.

One such solution has been to mount an additional rear wheel to each side of the existing rear wheels, thus widening the effective tread and bearing ability of those wheels. Another has been to utilize a flattened metal rear wheel to accomplish the same purpose. While utilization of two adjacent wheels provides better traction, the puncture problem continues to exist and there are still some problems with sinking into unstable terrain. The metal wheel, while less likely to sink, typically lacks traction and, particularly when the user must provide the motive power for the chair, has proven to be quite uncomfortable for the user to grasp.

A further problem encountered in such situations is that steering of the vehicle with the front wheels becomes awkward and difficult as the wheels become engaged with the unstable ground fully losing the ability to steer and support the wheelchair. As a result the wheelchair user is generally limited to using it on hard, unyielding surfaces, both indoors and out.

SUMMARY OF THE INVENTION

The present invention is an all-terrain vehicle created by attaching to a conventional wheelchair a novel set of wide auxiliary wheels or wheel extensions so that the wheelchair can be much more easily used off road on sandy, loose or unstable terrain than prior devices offered for this purpose. The apparatus of the present invention comprises a first pair of broad tire-like plastic or elastomeric treads which are attachable to and fit onto the rear wheels of the wheelchair. These treads provide a substitute handhold or grip for the operator to use similar in configuration to that mounted on the standard wheels. The treads are also slightly recessed inward from the original tire, being of a smaller diameter then the rear wheel, to permit the wheelchair to ride solely on the tire on hard surfaces and make propulsion on such surfaces the same as one would normally expect. The treads act in combination with a second pair of lightweight plastic wheels which are adapted to fit on either side of each of the two stanchion mounted front wheels, the combination acting to provide a broad bearing surface for better stability, load bearing ability and easier steering of said vehicle when used on said sandy, loose or unstable terrains.

In a second embodiment of the present invention, each of said front wheel attachments further comprises a plurality of small bearing wheels fitted between and below said broad second pair of wheels to allow easier steering and propulsion of said wheelchair on hard surfaces. The wheelchair also has fitted to it an anti-tipover apparatus to prevent flipping backward when negotiating difficult terrain and to alternately permit the wheelchair to be propelled in an upward angled or "wheelie" position which places the most substantial portion of the weight on the rear wheel, increasing traction on soft terrain. The apparatus of the present invention is light in weight and easily affixed to a conventional wheelchair so that the basic utility of the wheelchair is not compromised when adapted as herein described.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

DETAILED DESCRIPTION OF THE INVENTION

The following detailed description is of the best presently contemplated mode of carrying out the invention. This description is not intended in a limiting sense, but is made solely for the purpose of illustrating the general principles of the invention.

The various features and advantages of the present invention may be more readily understood with reference to the following detailed description, taken in conjunction with the accompanying drawings, wherein like numbers refer to the same feature or part thereof.

Figure 1:
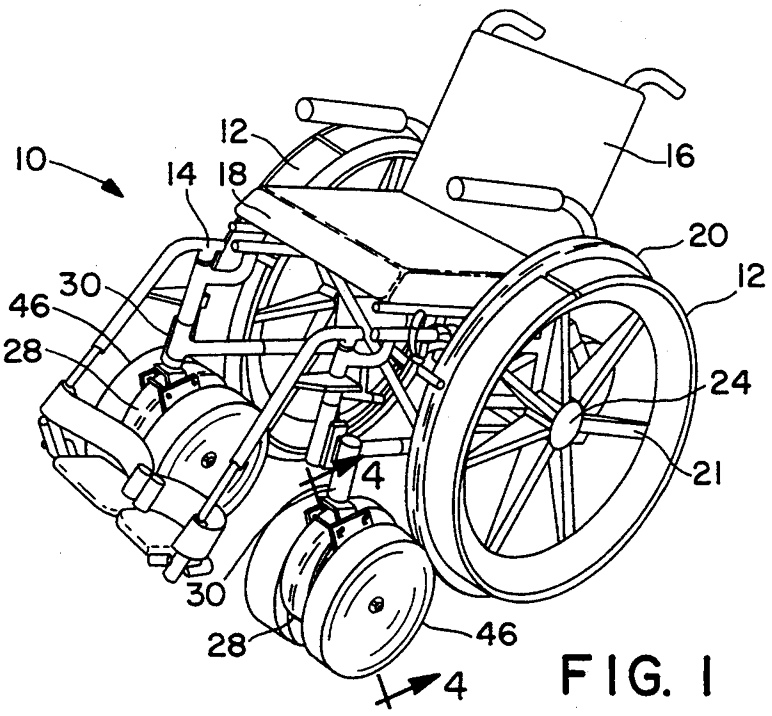
FIG. 1 is an isometric view of a conventional manually operated wheelchair, said chair further comprising the apparatus of the present invention.

Referring now to FIG. 1, there is shown a conventional street use wheelchair 10 having attached to it two soft terrain adapters 12 of present invention. In its most basic aspects, the wheelchair 10 comprises a frame 14, typically fabricated from aluminum, tubular steel, metal alloys (including titanium) or other lightweight sturdy material, said frame having substantially identical left and right hand portions and further being fabricated with a set of horizontal supports for a chair-like portion 16 suspended therebetween. In some versions the horizontal supports are lockably hinged in the middle thereof, said hinging allowing the chair to be folded in half for easier storage and transport.

Figure 2:
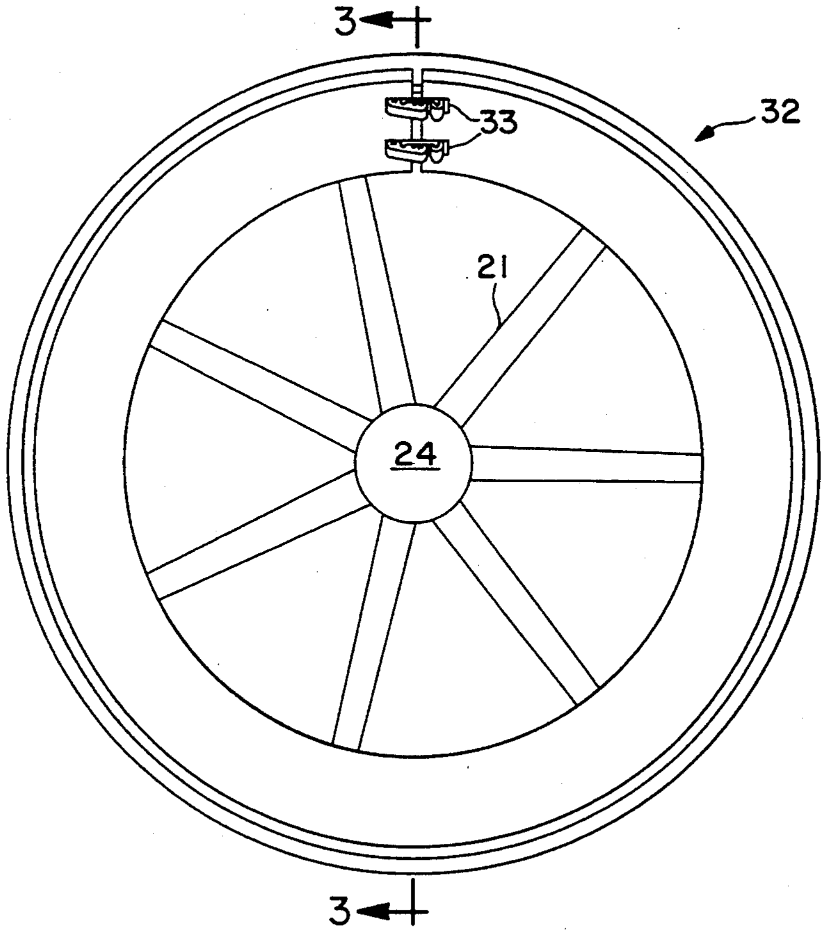
FIG. 2 is a side view of a rear wheel of a conventional wheelchair as in FIG. 1 illustrating the general position of the broad tread portion of the present invention as attached to the rear wheel of the wheelchair.
Figure 3:
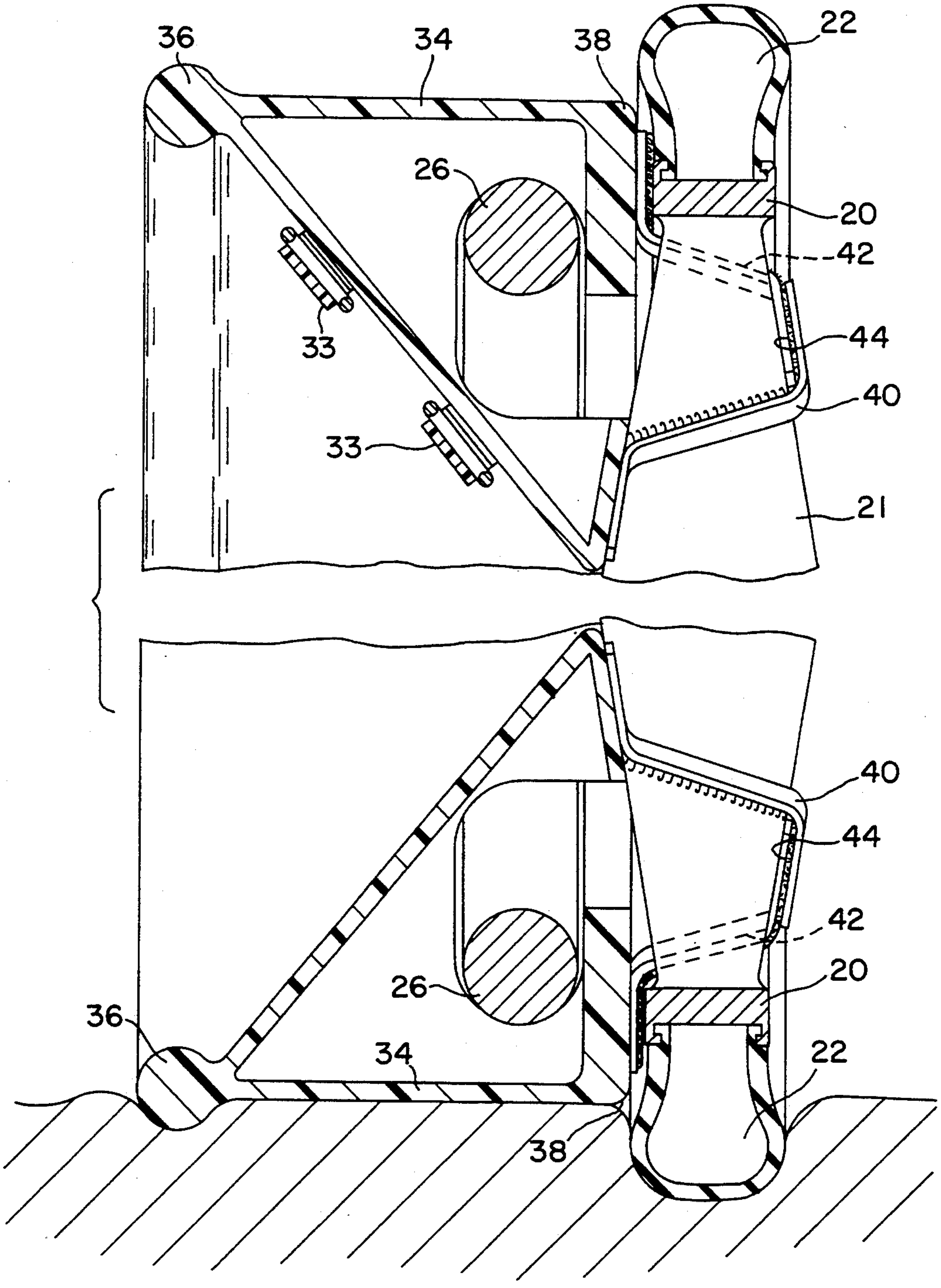
FIG. 3 is a partial cross-sectional view of the broad tread portion of the present invention taken along line 3—3 of FIG. 2. showing the manner of attachment to the rear wheel of the wheelchair.

Located essentially beneath the seat 18 of chair 16 is the axle for two identical rear propulsion wheels 20, one on either side of frame 14. Referring now to FIGS. 2 and 3, each wheel 20 typically having at its outer periphery a high pressure solid or semi-pneumatic rubber tire 22 adapted for travel over smooth hard surfaces. Further, each of said wheels 20 being rotatably attached to said frame through an axle adjacent the lower rear portion of the frame 14 with its end concentrically located in the wheel hub 24. Usually attached to the inside of each rear wheel 20 is a circular handwheel 26, which the user of the chair grasps and moves to cause the chair to move forward or backward.

Forward of chair 16 and located at the outermost, bottom portions of frame 14 are a pair of smaller diameter, narrow width ground engaging caster-type wheels 28 positioned forwardly of the rear wheels. The front wheels 28 are pivotally mounted in vertical stanchions 30, which gives the user of the chair the ability to steer the chair, at least to some degree, as it is moving.

The present invention encompassing the soft-terrain adaptors 12, enhances the capability of the wheelchair 10 to traverse loose, sandy and unstable terrain. These adaptors 12 are comprised of a pair of wide, lightweight load bearing attachments 32, one for attachment to each of rear wheels 20. As shown with more particularity in FIGS. 2 and 3, each of rear attachments 32 comprises a first, flexible substantially flat tread portion 34 which is connected end to end and mounted just inside the circumference of each of the rear wheels 20, initially held together place by one or more clips 33. Formed at the outermost side of each of the flat tread portions 34 is a bulbous outer portion 36 which, when installed outward of the wheel 20, can be grasped by the chair user for propulsive force. Extending inward toward each drive wheel 20 is an angular support 37 which contacts the outer surface of each wheel 20. The angular support 37 maintains the flat tread portion 34 of each rear load bearing attachments 32 in a substantially flat, perpendicular orientation to each of the wheels 20.

Positioning and final locking of attachment 32 to wheel 20 is illustrated most clearly in FIG. 3. As shown in FIGS. 1 and 2, there are fastened to the inner side of rear wheel attachment 32, first a right angled portion 38, which rests against the outer surface of tire 22 and acts to properly position the attachment 32 around the wheel and then a series of straps 40, 42 which are passed between and around the spokes 21 of wheel 20. Fastening to the wheel 20 is preferably accomplished by hook and loop type fastening strips 44 mounted on the meeting surfaces of each strap 40, 42. VELCRO TM type hook and loop fastener material is preferred as the fastening medium because it allows the assembly to be easily pulled snug and will stay securely locked with minimum effort to prevent slippage of the adapter 12 about the wheel 20 causing loss of manual propulsive force and stopping force. However, the method of such fastening is not critical, and it will be understood by those of skilled in the art that other fastening methods may be utilized without changing the basic utility or features as described above.

For ease of installation, rear attachment 32 and straps 40, 42 are typically made of flexible, but durable polymeric or elastomeric materials such as rubber or polypropylene. When the soft terrain adaptors 12 are placed onto and attached to the wheel 20 by means of the fasteners 44 intertwining through the spokes 21, the attachment clips 33 (mounted to the outside of the adaptors 12) can be connected and tightened so that the adaptors 12 take on the substantially circular configuration of the wheel. On so doing the soft terrain adaptor 12 does not interfere with the tire 22 as the tire still extends a short distance outward from the axle beyond the flat tread portion 34 and the bulbous outer grip portion 36 of the adaptor 12. This is so the wheelchair 10 (when placed in position on smooth, hard terrain) the tire 22 remains in contact with that terrain rather than the adaptor 12.

The adaptor 12 provides increased stability in rough, soft terrain for the wheelchair 10 by providing an expanded outward surface for stability and the grip portion 36 of the adaptor 12 is a substitute for the hand propulsion wheel 26 of the wheelchair 10. Further, the flat tread portion 34 provides an enhanced land bearing ability while significantly decreasing the chance for the wheelchair to sink into and become mired in the soft terrain. Thus, the user of the wheelchair 10 is afforded the opportunity of continuing to self-propel the chair through the use of the grip portion 36 of the adaptor 12 on either a hard surface or on a soft surface without incurring significant problems of stability, increased propulsion force, or increased frictional forces beyond what would be expected from soft versus hard surfaces. Although the embodiment illustrated in FIGS. 1–3 shows the outer surface of rear wheel attachment 32 to be substantially smooth, it should be understood that treads, cleats or other external features to improve traction, particularly on wet or slippery surfaces, may be incorporated into the design thereof without difficulty and such external features are to be considered as being within the ambient of the present invention.

It should also be understood that when the soft-terrain adaptors 12 of the present invention are attached to a conventional street use wheelchair, the user of the chair is in substantially the same position relative to the drive wheels on rough, soft terrain as when travelling over smooth, hard terrain so that it will be no more demanding to provide manual or other propulsive force to the wheels than before. Additional features, such as an electric powered motor, may also be incorporated into the design of the wheelchair without departing from the spirit of the invention.

Figure 4:
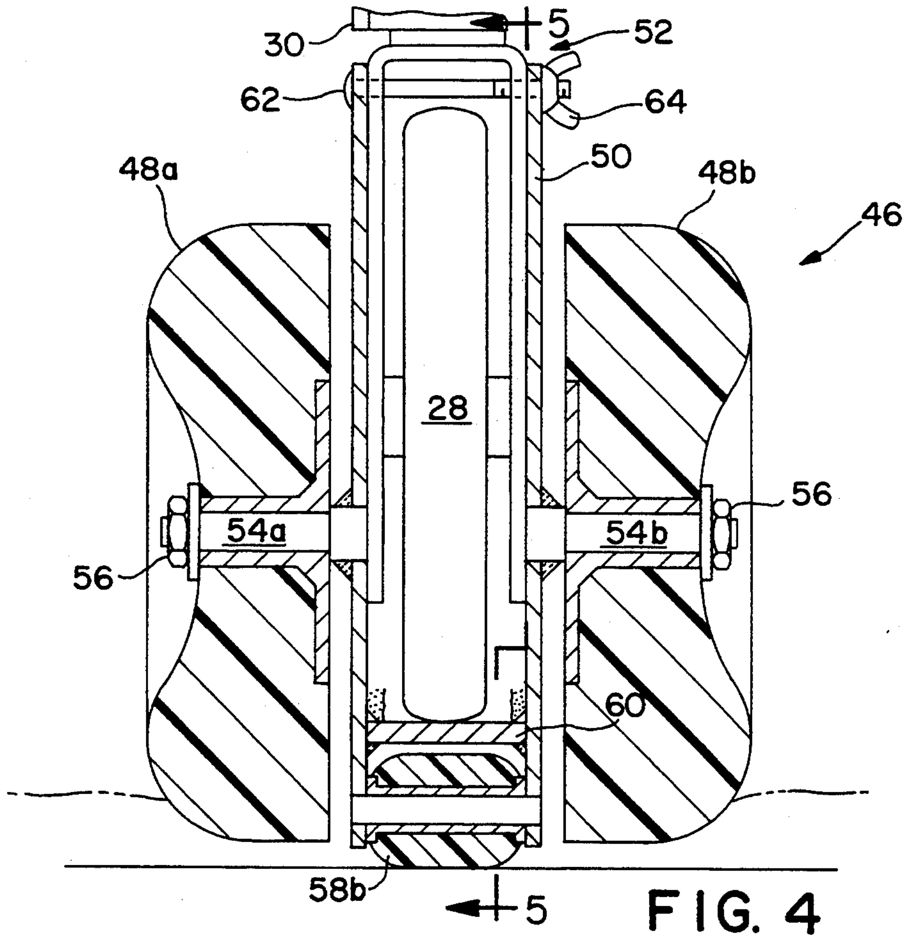
FIG. 4 is a cross-sectional view of one embodiment of the front wheel extension attachment of the present invention taken along line 4—4 of FIG. 1.
Figure 5:
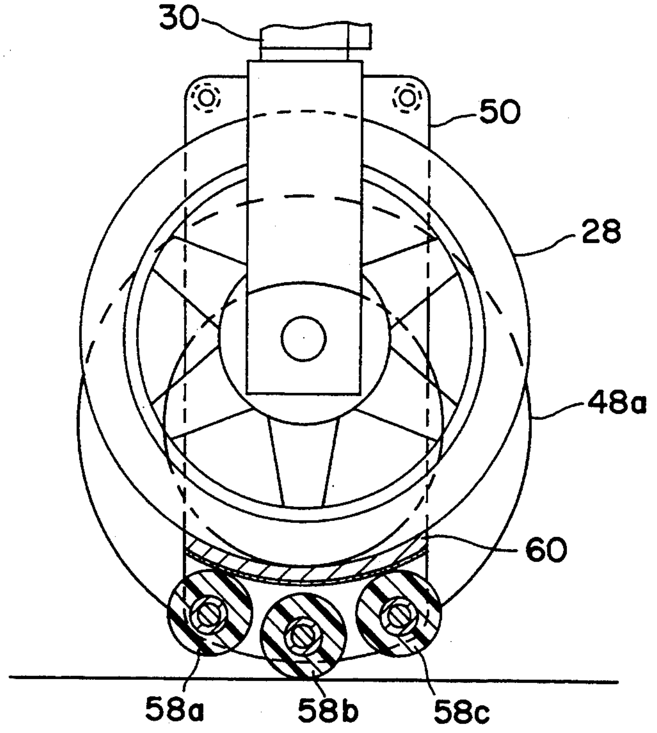
FIG. 5 is a second cross-sectional view of the front wheel extension attachment of the present invention taken along line 5—5 of FIG. 4.

Steering ability for the wheelchair in soft terrain is provided by front wheel soft terrain adaptors 46 as illustrated in FIGS. 4 and 5. In this embodiment, each front wheel attachment 46 comprises a pair of rotatable, axially mounted wide auxiliary wheels 48 *a, b* located on an H-shaped frame 50 which fits on either side of the front wheel 28, supporting the front wheel, and attaching to the stanchion 30 by means of bracket assembly 52. Each of the wide auxiliary wheels 48 *a, b* are independently axled to each side of the H-shaped frame 50 so that each of the wheels is freely rotatable about axes 54*a*, 54*b*. Each of the wheels 48 *a, b* is held in place by end securing nut 56 which permits rotational motion about the respective axes while retaining each of the wheels in place on the frame 50.

In this embodiment (as shown in FIGS. 4 and 5) the caster-type wheel 28 is of the larger variety, and therefore, requires that the axis of rotation for the wheels 48 *a, b* be somewhat lower than the axes of rotation for the wheel 28. This gives rise to a space between the wheels 48 *a, b* (below wheel 28) which gives rise to the H-shape of the frame 50. The cross-bar of the H-frame 50 is immediately below the wheel 28 and contains below it and within the downward projecting sides of the frame a series of wheels 58 *a,b* and *c* which provide both a more uniform bottom surface and a slight vertical extension (similar to that of the tire 22 above the flat tread portion 34 of the adaptor 12) to contact a hard surface.

As shown more clearly in FIG. 5, the cross-bars of the H-frame 50 is a curved plate 60 between the downward extending upright portions of the sides of said H-frame extending in an arc from front to back (as shown in FIG. 5) to conform to the curvature of the front wheel 28. In the short lower portion of the H-frame 50 one or more small diameter wheels 58 *a, b* and *c* are fitted to lie just below wheel 28 and between the wide wheels 48 a, b. These short wheels 58, typically made of a foamed plastic material such as polystyrene or polyurethane, improve the ability of the user to steer the wheelchair 10 on relatively firm surfaces by reducing the frictional resistance of the front wheels to changing direction particularly when the chair is as rest. The wheels 58 are arranged and configured to mimic, as closely as possible, the caster-type wheel 38 they replace when the front adaptor 46 is in place. In the particular embodiment illustrated in FIGS. 4 and 5, an arcuate linear arrangement of three steering wheels 58 *a–c* is built into each front wheel adaptor 46 to improve the steering support offered on slopping terrain. It should be understood that more or fewer of steering wheels 58 may be used without departing from the spirit of the invention.

Attachment of the embodiment illustrated is accomplished by merely slipping each front wheel 28 between the two upright sides of the upper portion of H-frame 50. When the wheel 28 is properly seated against the curved plate 60, the frame is then clamped to the stanchion 30 above the wheel 28 using the bracket assembly 52. One method of such clamping, using a pair of long bolts 62 and wing nuts 64 to lock the front wheel adaptor 46 in place is illustrated. Other methods of attachment achieving the same results which are now known or later discovered may also be used.

Figure 6:
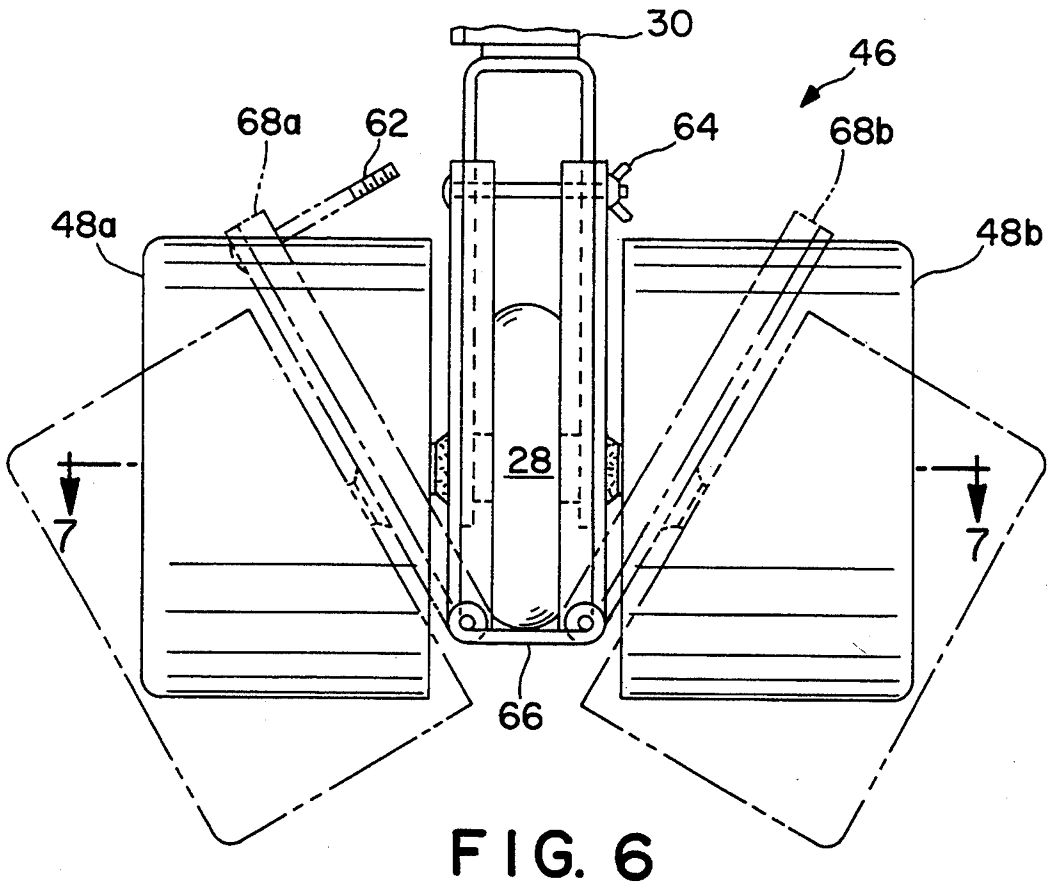
FIG. 6 is a front view of a second embodiment of the front wheel extension attachment of the present invention illustrating the attachment over the front wheel of the wheelchair.

A second embodiment of the present invention is illustrated in FIG. 6. In this embodiment, no support wheels 58 are required and a hinged U-shaped frame 66, as illustrated in FIG. 6, is used. The bottom of the frame 66 is positioned under and on either side of each front wheel 28. In this case the caster-type wheel 28 is of the smaller diameter and mounted lower in the support. Due to the lower mounting of the wheel 28, the upright sides of the U-shaped frame 66 permits the co-linear alignment of the axles of the wheels 48 *a, b* along the same axes as the axle for the wheel 28. The lowering of the axle height for the adaptor 46 permits the elimination of the steering wheels 58. The bottom portion of the U-shaped frame 66 acts as a buffer against the original equipment wheel 28 from sinking into, or becoming mired in, soft terrain when put into position over the wheel 28.

Figure 7:
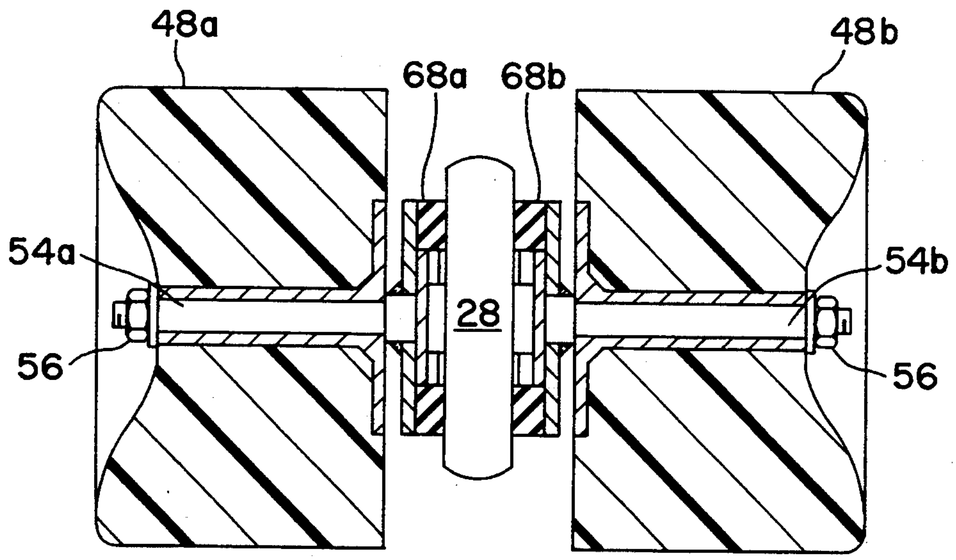
FIG. 7 is a cross-sectional view of another embodiment of the front wheel extension attachment of the present invention illustrating another manner of attachment to the wheelchair.

Referring now to FIG. 7, the uprights 68 *a, b* of the U-shaped frame 66 sandwich the wheel 28 when connected at their topmost portion by use of a bolt and wing nut 62, 64. The placement of the second embodiment of the front wheel soft terrain adaptor 46 is shown in FIG. 6 in phantom, and when attached in solid lined form. Referring again to FIG. 7, the wheels 48 *a, b* are attached to the respective axles 54 *a, b* and held in place by the hub nut 56, which nut permits free rotational motion of each of the wheels. The wheels 48 *a, b* each have a central recess on the outside vertical surface of the wheel to accommodate the connecting hardware without creating any additional appendage for becoming entangled or mired in rough terrain, or in causing injury in a crowded place.

In another embodiment, the wide wheels 48 *a, b* can be attached to the wheel 28 by removing the short axle of front wheel 28 and replacing it with a longer axle joining all of the wheels 28 and 48 *a, b* on the same axle. This axle is of sufficient length to accommodate both the wide wheels 48 *a, b* in the position shown in FIG. 7 and to accommodate a pair of spacers one on each side of wheel 28, so that all of the wheels 28 and 48 *a, b* will turn freely when the wheelchair 10 is in motion.

All of the clearance tolerances between any of the elements of the wheelchair 10 and the elements of the embodiments described immediately above concerning the front wheel adaptors 46 are quite close to avoid the jamming of the rotational operation of the wheels while, at the same time, providing sufficient space for the filtering through of fine sand, soil, stranded material or the like. The dimensional tolerances on the rear wheel adaptors 12 are similarly chosen to provide extremely close clearances and fit to the wheels 20 and to provide a reasonable reachable physical construction of the hand grip 36 as a substitute for the hand wheel 26 of the standard wheel of the wheelchair 10.

Figure 8:
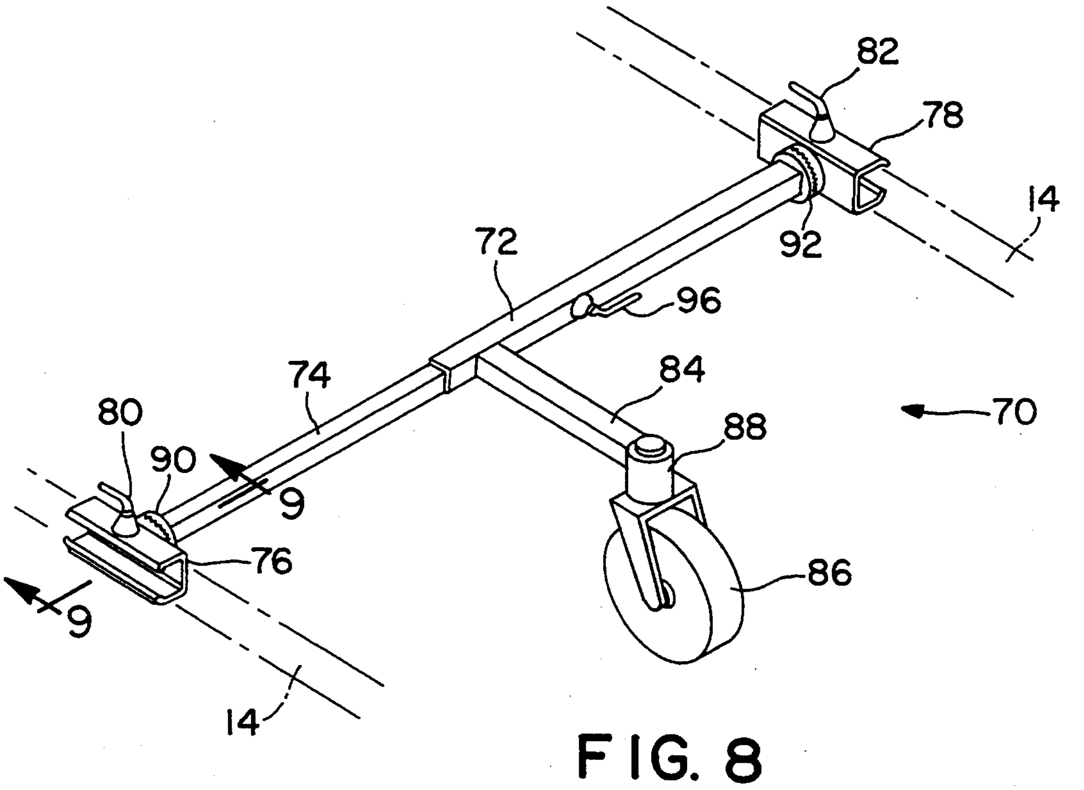
FIG. 8 is an isometric view of the anti-tipover apparatus of the present invention adapted to mount to the lower rear portion of the frame of the wheelchair.
Figure 9:
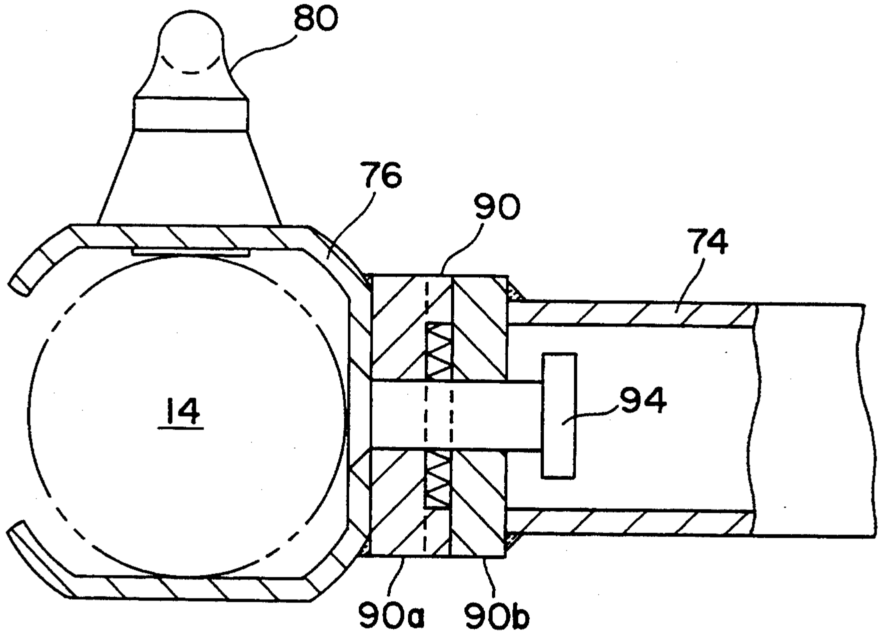
FIG. 9 is a cross-sectional view of the mounting and adjustment mechanism of the anti-tipover apparatus tube along Line 9—9 of FIG. 8.

Referring now to FIGS. 8 and 9, an anti-tipover apparatus 70 is shown for connection to the lower, rear portion of the frame 14 to the rear of the axles interposed between the wheels 20. The anti-tipover means 70 is comprised of an adjustable expansion connection bar 72 which is adjustable by contracting or expanding in or out, respectively, to fit between the lower frame supports on either side of the wheelchair 10. The expansion bar 72 may be of square, hollow stock as shown (or of round, hollow stock) so that the expansion bar 74 can move inward or outward to accommodate the span between the horizontal supports of the lower rear portion of the frame 14. At each end of the expansion bar 72 is a clamp mechanism 76, 78 for attachment to the left and right sides of the frame 14, respectively. The clamps 76, 78 can either be slid over the lower supports of the frame 14 from the rear of the wheelchair 10 or the clamps can over-expand to be snapped over the supports at any point along the rearward portion of the lower frame supports. Once the clamps 76, 78 are positioned and overlie the selected portion of the frame then the locking screws 80, 82 on each of the clamps 76, 78 can be engaged to firmly lock the anti-tipover means 70 in place relative to the frame 14.

From a point median, the lower rear portions of the frame 14 and extending rearward from the expansion bar 72 is a support arm 84 terminating at its distal end with a vertically shafted guide wheel 86. The support arm 84 is permanently and fixedly attached to the expansion bar 72 so that no movement can be experienced at that joint. The guide wheel 86 is journaled through a vertical shaft 88 so that the guide wheel 86 is freely rotatable about the substantially vertically oriented shaft a complete 360°. The guide wheel 86 can be of the caster type (as shown in FIG. 8), or of a wider cylindrical type as in the front wheel adapter 46, or of the spherical type as long as the range of motion remains the same. The degree of tilt from the horizontal plane (i.e. the plane of the surface over which the wheelchair 10 is travelling) is governed by the orientation of the expansion bar 72 relative to the clamps 76, 78.

In order to change the range of permitted rear tilt for the wheelchair 10, configured for street use or all terrain use, the toothed clamps 90, 92 are positioned to rotate the expansion bar 72 counterclockwise to raise or lower the support arm 84 to or from the horizontal plane of the surface over which the wheelchair 10 is to travel through an arc curving upward to the maximum allowable range to prevent a backward spill or tipover of the chair. The two parts of the rotatable clamp 90, 90 *a* and 90 *b*, are separated from each other by collapsing the bar 74 into the expansion bar 72 so that the teeth on clamp part 90 *b* move away from the teeth on clamp part 90 *a* to the maximum extension allowed by stop 94. The identical operation is achievable on the opposite side for clamp 92. When the appropriate rotation is achieved, the bars 72, 74 are telescoped (extended) outward so that the teeth of the rotatable clamp portions 90 *a* and 90 *b* re-engage locking the expansion bar 74 in its rotated position. The same process of engaging the teeth of rotatable clamp 92 is to be accomplished at the same time. Once the bar 72 is rotated to the desired upward angle, the locking screw 96 is engaged such that the bars 72, 74 can no longer telescope in either direction which, in cooperation with the engaged teeth of the rotatable clamps 90, 92, retain the bar 72, support arm 84, and guide wheel 86 in the desired angular position.

It is preferred that the backward tipover angle not exceed 35° upward from the horizontal, but any angle within that range is acceptable and falls within the spirit of the present invention. The desirable anti-tipover angle for an individual user accustomed to balance the wheelchair 10 in a raised front or "wheelie" position is 30° upward from the horizontal. The anti-tipover means 70 is capable of temporarily supporting the wheelchair 10 in the raised front of "wheelie" position without collapse which increases the utility of the wheelchair by an individual, unaccompanied user in soft terrain by increasing traction over the terrain. In this upward angled position the wheelchair has no contact with the underlying terrain at its front support wheels since the center of gravity is relocated to a position approximating the rear wheel axle. The anti-tipover means 70 will prevent the wheelchair 10 from tipping backwards beyond the allowable angular range and can be used in either the conventional or improved all-terrain version of the wheelchair 10.

Thus, there has been described a new and improved all-terrain wheelchair and an apparatus for converting a conventional wheelchair into one usable on any type terrain. The adapting of such modifications to a powered wheelchair are not outside the scope of the present invention but will require some improvement to the described adapters utilized by the present invention. It is to be understood that the above-described embodiments are merely illustrative of the many specific embodiments which represent applications and uses of the present invention. Clearly, numerous other arrangements such as motorized drives can be readily devised by those of skill in the art without departing from the spirit and scope of the invention as defined in the appended claims and all changes which come within the scope and equivalency of the claims are intended to be embraced therein.

I claim:

1. An all-terrain vehicle, said vehicle comprising, in combination:

a wheelchair having a frame, a pair of rearwardly positioned drive wheels one axially mounted to each side of said frame, a seat positioned within said frame substantially between said drive wheels to accommodate the user of said chair, and a pair of small diameter, narrow width steering wheels each positioned on either side of said frame forward of said drive wheels;

detachable load bearing and propulsion extension means adapted to fit against, outward of and just inside the circumference of said drive wheels and provide traction on soft, sandy, loose or uneven surfaces without changing the relative position of the user of said wheelchair to said drive wheels; and detachable means for supporting said steering wheels without compromising the steering ability of said steering wheels when said vehicle is used on soft, sandy, loose or uneven surfaces.

2. The all-terrain vehicle of claim 1 wherein each of said detachable load bearing propulsion extension means comprises a flexible substantially flat tread portion which connects end-to-end and mounts interior of the circumference to each of said drive wheels to form a continuous load bearing surface terminating along the outer edge in a graspable bulbous portion extending circumferentially and outwardly of each drive wheel which the chair user can grasp to provide a propulsive force for said chair, and a plurality of positioning/attachment means located roughly equidistantly around the inner surface of said flat tread portion between the outer circumference of said drive wheel and said inner surface, said positioning/attachment means comprising means for properly positioning said load bearing and propulsion extension means to said drive wheels and for snugly tightening said load bearing and propulsion extension means into position.

3. The all-terrain vehicle of claim 2 wherein each of said positioning/attachment means comprises a right angled portion which is an inward extension of the flat tread portion, said right angle section being positioned to rest against the outer surface of said drive wheel and act to properly orient the load bearing and propulsion extension means against the drive wheel in combination with a plurality of strap means having one end anchored to said right angled portion and the other end anchored to an angular support means extending inward from said bulbous portion and resting against said drive wheel, a first part of said strap means being passed through the spokes of the drive wheel to make contact with a second part of said strap means and lockingly fasten together to hold the load bearing and propulsion extension means in position.

4. The all-terrain vehicle of claim 3 wherein said said plurality of straps each comprises a pair of hook and loop type fasteners each being mounted onto the opposing surfaces of said first and second parts of said strap means.

5. The all-terrain vehicle of claim 1 wherein said detachable means comprises a pair of rotatable, axially mounted broad auxiliary wheels located on an H-shaped frame secured to each of said steering wheels, said H-shaped frame having a relatively large upwardly opening channel adapted to fit on either side of each steering wheel, said channel provided with a curved plate which spans the gap across the channel between the upright portions of the H-shaped frame, said curved plate positioned so that the broad auxiliary wheel axles will be substantially in line with the axle of each steering wheel.

6. The all-terrain vehicle of claim 5 wherein said H-shaped frame further having a lower section containing at least one small diameter, short steering wheels fitted into said H-shaped frame lower section to lie just below the curved plate and between the broad auxiliary wheels to improve the ability of the user to steer the chair on relatively firm surfaces by reducing the frictional resistance of the front wheels to changing direction when the chair is in motion.

7. The all-terrain vehicle of claim 6 wherein said lower section of said H-shaped frame houses at least three of said short steering wheels positioned one behind the other within said lower H-shaped frame section.

8. The all-terrain vehicle of claim 1 wherein said detachable means comprises a pair of rotatable, axially mounted broad auxiliary wheels located on a U-shaped frame secured to each of said steering wheels and adapted to fit on either side of a steering wheel and support said steering wheel within said U-shaped frame by a cross bar which underlies said steering wheel and spans the gap between the upright portions of the U-shaped frame, said cross bar being positioned so that the broad auxiliary wheel axles will be substantially in line with the axle of each steering wheel.

9. The all-terrain vehicle of claim 8 wherein said broad auxiliary wheels and said steering wheel are mounted on a common axle.

10. The all-terrain vehicle of claim 1 further comprising an anti-tipover means to prevent backward tip beyond a maximum angle from the horizontal plane of the underlying surface attached to the lower side supports of the frame and rearwardly of the axle for the drive wheels, said anti-tipover means being angularly adjustable by a rotatable means attached between said lower side supports of the frame along a telescoping bar spanning the distance between the lower side supports of the frame.

11. The all-terrain vehicle of claim 10 wherein the maximum angle falls within a range not to exceed 35° from the horizontal plane of the underlying surface.

12. The all-terrain vehicle of claim 1 wherein said detachable load bearing and propulsion extension means is made from a group of materials consisting essentially of polymeric or elastomeric material.

13. The all-terrain vehicle of claim 1 wherein said broad auxiliary wheels are made from a foamed polymeric material.

14. An all-terrain attachment for a wheelchair, said wheelchair having a frame comprising a pair of rearwardly positioned drive wheels axially mounted one on either side of said frame for travel over smooth and hard surfaces, a seat positioned within said wheelchair frame positioned substantially over the axle for said drive wheels to accommodate the user of said chair, and a pair of small diameter, narrow width steering wheels each positioned on either side of said frame forward of said drive wheels, said attachment comprising in combination, plural detachable load bearing and propulsion extension means adapted to fit against and outward of and just inside the circumference of said drive wheels and provide traction on soft, sandy, loose or uneven surfaces without changing the relative position of the user of said wheelchair to said drive wheels and further comprising detachable means for supporting said steering wheels without compromising the steering ability of said steering wheels when said vehicle is used on soft, sandy, loose or uneven surfaces.

15. The all-terrain vehicle of claim 14 wherein each of said plural detachable load bearing and propulsion extension means comprises a flexible substantially flat tread portion which connects end-to-end and mounts interior of the circumference of the outermost sides of said drive wheels to form a continuous load bearing surface terminating along the outer edge in a graspable bulbous portion extending circumferentially and outwardly of each drive wheel which the chair user can grasp to provide a propulsive force for said chair, and a plurality of positioning/attachment means located roughly equidistantly around the inner surface of said flat tread portion between the outer circumference of said drive wheel and said inner surface, said positioning-/attachment means comprising means for properly positioning said load bearing and propulsion extension means to said drive wheels and for snugly tightening said load bearing and propulsion extension means into position.

16. The all-terrain vehicle of claim 15 wherein each of said positioning/attachment means comprises a right angled portion which is an inward extension of the flat tread portion, said right angle section being positioned to rest against the outer surface of said drive wheel and act to properly orient the load bearing and propulsion extension means against the drive wheel in combination with a plurality of strap means having one end anchored to said right angled portion and the other end anchored to an angular support means extending inward from said bulbous portion and resting against said drive wheel, a first part of said strap means being passed through the spokes of the drive wheel to make contact with a second part of said strap means and lockingly fasten together to hold the load bearing and propulsion extension means in position.

17. The all-terrain vehicle of claim 16 wherein said plurality of straps each comprises a pair of hook and loop fasteners each being mounted onto the opposing surfaces of said first and second parts of said strap means.

18. The all-terrain vehicle of claim 14 wherein said detachable means comprises a pair of rotatable, axially mounted broad auxiliary wheels located on an H-shaped frame secured to each of said steering wheels, said H-shaped frame having a relatively large upwardly opening channel adapted to fit on either side of each steering wheel, said channel provided with a curved plate which spans the gap across the channel between the upright portions of the H-shaped frame, said curved plate positioned so that the broad auxiliary wheel axles will be substantially in line with the axle of each steering wheel.

19. The all-terrain vehicle of claim 18 wherein said H-shaped frame having a lower section containing at least one small diameter, short steering wheels fitted into said H-shaped frame lower section to lie just below the curved plate and between the broad auxiliary wheels to improve the ability of the user to steer the chair on relatively firm surfaces by reducing the frictional resistance of the front wheels to changing direction when the chair is in motion.

20. The all-terrain vehicle of claim 19 wherein said H-shaped frame further comprises a lower section housing at least three of said steering wheels positioned one behind the other within said lower H-shaped frame section.

21. The all-terrain vehicle of claim 14 wherein said detachable means comprises a pair of rotatable, axially mounted broad auxiliary wheels located on a U-shaped frame secured to each of said steering wheels and adapted to fit on either side of a steering wheel and support said steering wheel within said U-shaped frame by a cross bar which underlies said steering wheel and spans the gap between the upright portions of the U-shaped frame, said cross bar being positioned so that the broad auxiliary wheel axles will be substantially in line with the axle of each steering wheel.

22. The all-terrain vehicle of claim 21 wherein said broad auxiliary wheels and said steering wheel are mounted on a common axle.

23. The all-terrain vehicle of claim 14 further comprising an anti-tipover means to prevent backward tip beyond a maximum angle from the horizontal plane of the underlying surface attached to the lower side supports of the frame being and rearwardly of the axle of the drive wheels, said anti-tipover means being angularly adjustable by a rotatable means attached between said lower side supports of the frame along a telescoping bar spanning the distance between the lower side supports of the frame.

24. The all-terrain vehicle of claim 23 wherein said maximum angle falls within a range not to exceed 35° from the horizontal plane of the underlying surface.

25. The all-terrain vehicle of claim 15 wherein said detachable load bearing and propulsion extension means is made from a group of materials consisting essentially of polymeric or elastomeric material.

26. The all-terrain vehicle of claim 15 wherein said broad auxiliary wheels are made from a foamed polymeric material.

* * * * *

UNITED STATES PATENT AND TRADEMARK OFFICE

CERTIFICATE OF CORRECTION

PATENT NO. : 5,427,398

DATED : June 27, 1995

INVENTOR(S) : Steven L. Weybrecht

It is certified that error appears in the above-indentified patent and that said Letters Patent is hereby corrected as shown below:

In the drawings, Sheet 2, Fig. 3, the reference numeral 37 should be applied to the angular support of the load bearing attachments 32.

Signed and Sealed this

Twenty-eighth Day of May, 1996

Attest:

Bruce Lehman

BRUCE LEHMAN

*Attesting Officer* *Commissioner of Patents and Trademarks*

UNITED STATES PATENT AND TRADEMARK OFFICE
CERTIFICATE OF CORRECTION

PATENT NO. : 5,427,398

DATED : June 27, 1995

INVENTOR(S) : Steven L. Weybrecht

It is certified that error appears in the above-identified patent and that said Letters Patent is hereby corrected as shown below:

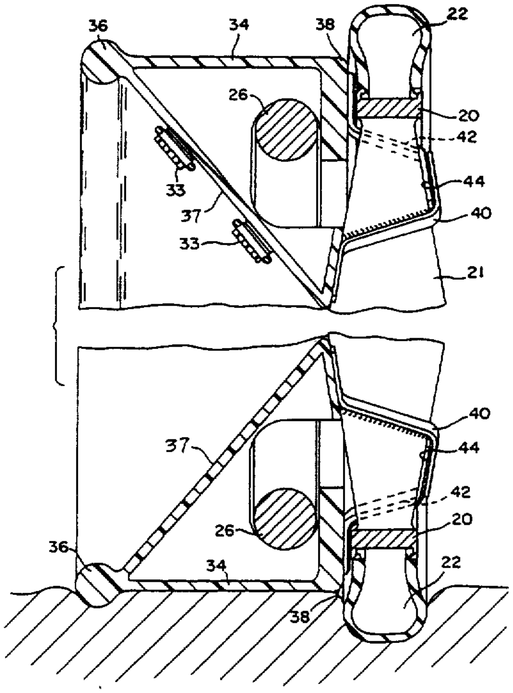

FIG. 3